C. P. LANDRETH.
ELECTROCHEMICAL TREATMENT OF LIQUIDS.
APPLICATION FILED AUG. 6, 1915.
1,222,637.
Patented Apr. 17, 1917.
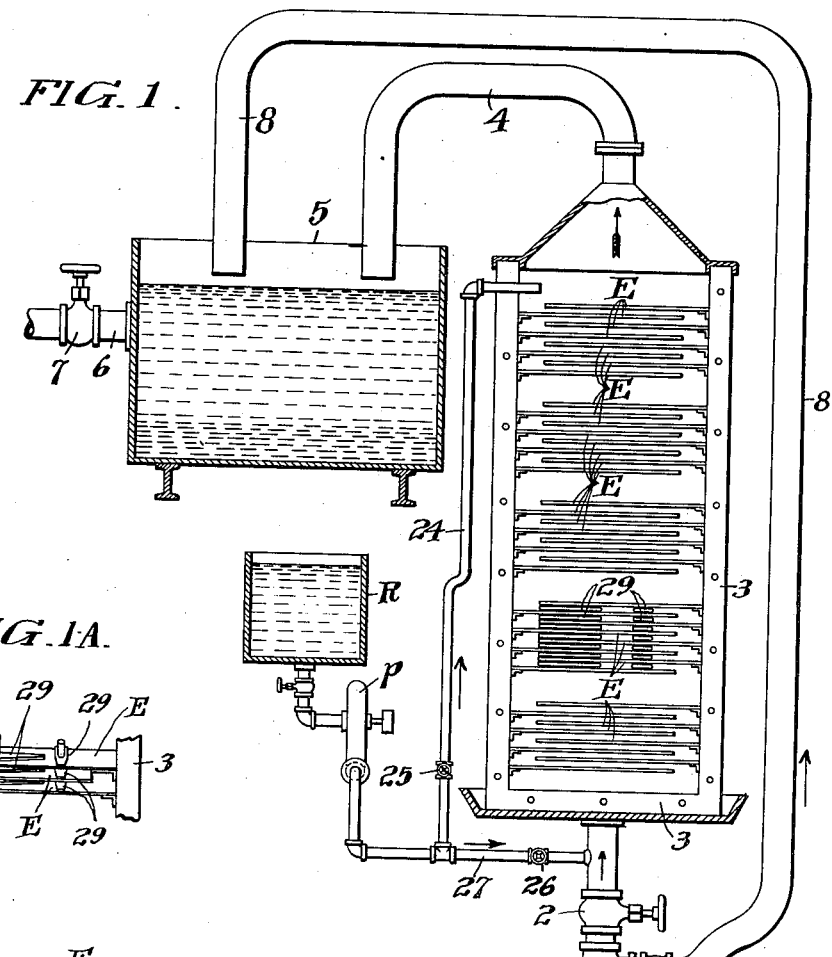
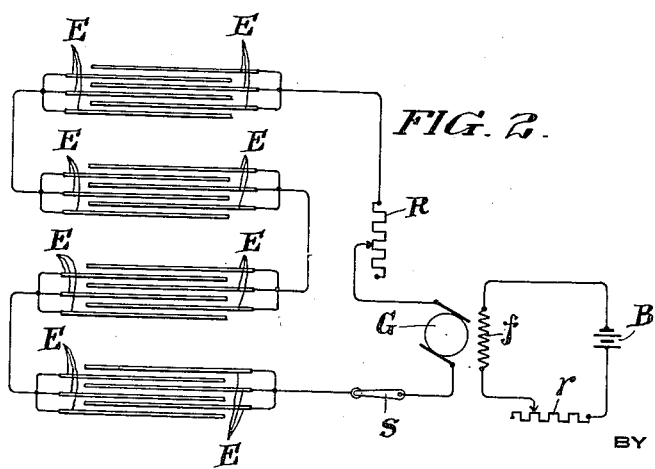
INVENTOR
Clarence P. Landreth
BY Cornelius D. Ehret
his ATTORNEY

UNITED STATES PATENT OFFICE.

CLARENCE P. LANDRETH, OF PHILADELPHIA, PENNSYLVANIA.

ELECTROCHEMICAL TREATMENT OF LIQUIDS.

1,222,637.  Specification of Letters Patent.  Patented Apr. 17, 1917.

Application filed August 6, 1915. Serial No. 43,909.

*To all whom it may concern:*

Be it known that I, CLARENCE P. LANDRETH, a citizen of the United States, residing in the city of Philadelphia, county of Philadelphia, and State of Pennsylvania, have invented certain new and useful Improvements in Electrochemical Treatment of Liquids, of which the following is a specification.

My invention relates to the treatment of liquids, waters, sewage, etc., for removing incrustating salts, for softening, for removal of colloidal and suspended matter, and for removing bacteria or rendering the liquid unsuitable for bacterial growth.

My invention resides in the process of treating liquid or water containing incrustating salts such as soluble salts of calcium, magnesium, etc., by adding thereto a reagent, such as sodium carbonate, calcium hydroxid, barium hydroxid, sodium hydroxid, potassium hydroxid, or other suitable reagent, and passing electric current through the liquid or water before, during or after the addition of such reagent or reagents to the liquid or water, the passing of the electric current stimulating the chemical action either during the passage of the current or thereafter, through its effects, with the result that insoluble salts of calcium, magnesium, etc., are produced which easily and rapidly separate from the liquid or water. When the soluble salts in solution are such as produce what is termed "temporary hardness", the reagent employed is a soluble hydroxid, preferably calcium hydroxid, which is added in such quantity that after reacting upon the contents of the liquid or water there remains an excess of the reagent, causing the liquid or water to contain free alkali. When it is desired to remove from the liquid or water those soluble salts which produce what is termed "permanent hardness" I use a reagent sodium carbonate or other soluble carbonate, and if desired in excess whereby the water or liquid is left alkaline for hastening sedimentation.

My invention resides also in the removal of finely divided suspended matter and bacteria from water or sewage by the passage of current through the liquid and introducing into the same either before, during or after the passage of the current in the presence of either carbon or metal positive electrodes such quantities of alkali as to insure in the liquid subsequent to the electrical treatment free alkali or hydrate in solution which hastens coagulation and the ready sedimentation or filtration of such foreign matter. When a positive electrode of iron or other suitable metal is used the hydroxid of the electrode material which may be formed will remain as such due to the free alkali, and therefore possesses coagulating value and will not be dissolved. The strength of the current when there is free alkali in the water or sewage during the electrical treatment may be made such that hydroxid of the positive electrode material is formed. For removal of finely divided suspended matter and bacteria, the free alkali acts as an electrolyte and precipitant, and brings together the suspended particles, forming larger masses which are sedimentized and carried down by any hydroxid of the electrode material or any other flocculent formed or present.

And my invention resides in the treatment of liquids, waters or sewage for removal of suspended matter therefrom and for eliminating the bacteria or rendering the liquid unsuitable for bacterial life, preferably by first subjecting the liquid, water or sewage to the action of electric current and immediately thereafter introducing into the same calcium hydroxid or other suitable hydroxid in quantity more than sufficient to react with contents of the liquid, water or sewage to produce a flocculent or coagulent which will carry down or sedimentize the suspended matter therein, leaving in the liquid, water or sewage an excess of the reagent, causing the liquid, water or sewage to contain free alkali which is at once an aid to sedimentation and renders the liquid effluent unsuitable for some forms of bacterial growth or life.

For an illustration of one of the forms of apparatus available for carrying out my process, and for further features of my process, reference is to be had to the following description and to the accompanying drawings, in which:

Figure 1 is a vertical sectional view, some parts in elevation, through apparatus for electro-chemically treating liquid.

Fig. 1ᵃ is a view, partly in perspective, of paddles used for agitating the liquid.

Fig. 2 is a diagram of a form of electrical circuit which may be used.

Referring to Fig. 1, the raw liquid, water or sewage to be treated enters through pipe 1 and valve 2 into the bottom of the treating chamber or tank 3 and out through its top through pipe 4 into a sedimentation or filtration tank 5 from which the finished liquid or water passes out through pipe 6 and valve 7, which is here arranged above the bottom of the tank 5 which may be considered as a sedimentation tank.

The entire volume of liquid or water to be treated may be passed through the chamber 3 as described, or any desired percentage of the liquid or water may be by-passed and delivered into the tank 5, for example, through the pipe 8 controlled by valve 8ª. In other words only a fraction of the entire water or liquid to be treated may be passed through the tank 3 and the water or liquid after treatment may be again mixed with the remainder of the raw liquid or water.

Within the tank 3 are disposed the electrodes E which are spaced and insulated from each other and so disposed that the liquid passes between the electrodes.

In the spaces between the electrodes I provide paddles 29 or other means rotating parallel to the faces of the electrodes to agitate the liquid and to remove any gases, sediment, hydroxid, etc., adhering to the electrodes. Apparatus of this character is disclosed in prior U. S. Patent No. 1,095,893 granted to me May 5, 1914.

Or any suitable electrolyzing apparatus may be used, a further example of which is described in my U. S. Patent No. 1,139,778, May 18, 1915, and in my co-pending application Ser. No. 866,559, filed October 14, 1914.

As shown in Fig. 2, each group of electrodes E may consist of a plurality of individual plates or electrodes connected in parallel, the different groups connected in series with each other in circuit with the source of current G, which may be a self excited dynamo-electric generator, or which may have its field $f$ separately excited from the source of current B controlled by the adjustable resistance $r$. In circuit with the generator G and the electrodes may be the adjustable resistance R, and the circuit controlling switch $s$.

The positive electrodes or plates may be made of metal, such as iron, steel, copper, aluminum, etc., or alloys of them, or of any suitable alloy, the material of the positive electrode being such that it aids in the formation of a flocculent hydroxid of such electrode material for certain purposes and under certain conditions; or the positive electrodes may be of carbon, platinum, or other chemically neutral or unattackable conducting material. The material of the negative electrodes is practically a matter of indifference and may be of metal or carbon, though iron or steel plates will commonly be used.

If the liquid, as water or sewage, to be treated contains organic or other oxidizable matter in suspension or solution, carbon or other chemically neutral or unattackable positive electrodes may be used. If, in such case, the liquid to be treated contains an ionizable salt in solution, as for example sodium chlorid, the raw liquid is introduced at the bottom of the tank 3 and passes between the electrodes as previously described. The current flowing through the liquid produces hypochlorites or nascent oxygen with resultant oxidation of organic content or other oxidizable material in the liquid, destroying the bacteria, and clarifying and decolorizing the liquid.

The thorough mixing and contacting of the hypochlorites or nascent oxygen with the oxidizable material in the liquid is hastened and facilitated by the rotating paddles, as above described. And as a further result, a very small quantity of the ionizable salt in the liquid because of the action between the numerous successive electrodes liberates a large amount of nascent oxygen in a small space of time, for a given ampere flow of current in the circuit, whereby the oxidizable matter is more completely and more rapidly treated.

And in case the raw liquid does not contain sufficient or any ionizable salt, above referred to, to be within the desired limits of efficiency in consumption of electrical energy, I introduce some soluble salt, as magnesium chlorid or sodium chlorid, or others. Such salt may be in solution in the reagent tank R from which it may be introduced into the raw water or liquid by pump $p$ through the pipe 27 and valve 26. In such case again, by the action above described, a large bleaching and oxidizing effect is produced, as compared with the case where separately or externally produced sodium hypochlorite or calcium hypochlorite liquor is introduced into the raw water or liquid, because such introduced hypochlorite simply re-acts upon the organic matter in the water in the usual way, as where two chemicals are poured together, and there is not a repeated or cyclic chemical decomposition and reformation of the salt attended by the liberation of large amounts of nascent oxygen.

For the treatment of waters or sewage having suspended matter existing therein either in the raw state or produced therein by reactions herein described, as for water softening or precipitation of incrustating salts, calcium or other hydroxid may be added to the water or sewage and be present therein during the electrical treatment in such quantity that the water or sewage contains free alkali after reaction with any water or sewage contents, the current strength in such case being made great enough for the production of hydroxid from the positive electrode metal; and where the positive electrode is of iron or steel, ferric hydroxid is produced which operates as a flocculent or sedimentizing agent for any suspended matter. The result is that in the effluent there is flocculent and free alkali, the free alkali preserving the flocculent as such and hastening sedimentation or filtration.

Or during the electrical treatment the calcium or other hydroxid may be absent, or present in quantity only sufficient to react with water or sewage content, with the result that electrical treatment will occur with the liquid or sewage lacking free alkali, in which case again flocculent hydroxid of the positive electrode metal will be produced; then after the electrical treatment calcium or other hydroxid may be introduced into the water or sewage to cause the same to contain free alkali which will preserve any flocculent formed by reactions with sewage content as, for instance, forming flocculent calcium carbonate, and sedimentation or flocculation occurs with greater rapidity and completeness with such free alkali present, and as such free alkali is present in greater degree.

In case there is present in the liquid or water bicarbonate of calcium, bicarbonate of magnesium, soluble carbonate of iron, soluble carbonate of copper, carbonic acid, etc., the reagent which may be used for their removal is sodium hydroxid, or potassium hydroxid, or preferably, calcium hydroxid, the latter introduced as such, or as resulting from introduction of calcium oxid or milk of lime.

Such reagent may be introduced from the tank R by pump $p$ through the pipe 27 and valve 26 into the liquid or water before or as it enters the treating chamber 3 so as to be present therein during the subjection of the liquid to the action of the electric current; or the valve 26 may be closed and the valve 25 opened, in which case the reagent will be introduced into the liquid or water through pipe 24 immediately after the liquid has been subjected to and stimulated by the electric current. It will be understood that the reagent may be introduced at either of the points referred to or at any point within the chamber 3, or may be introduced into the liquid after it has passed from the chamber 3.

When the liquid or water contains calcium sulfate, magnesium sulfate, iron sulfate, copper sulfate, aluminum sulfate, or other soluble sulfates or other soluble salts of the metals referred to or of other metals or when containing other incrustating salts in solution, the reagent used may be sodium carbonate, or other soluble carbonate, which may be introduced through valve 26 or valve 25 or at any other of the points referred to.

The result of the introduction of the reagents is their reaction with the calcium and magnesium bicarbonates and sulfates and other substances referred to to produce insoluble compounds of calcium, magnesium, etc., which are precipitates and will sedimentize in the tank 5, and will act as coagulating or flocculating agents for sedimentizing any suspended matter in the liquid.

The passage of the current through the liquid ionizes the salts or compounds in solution therein, thereby stimulating them quickly and promptly chemically to react with the reagent in the liquid during the electrical treatment or added thereto thereafter, with the result that the insoluble compounds or precipitates are quickly and rapidly formed, with the result that the treated liquid may be immediately and quickly sedimentized or filtered to separate therefrom such insoluble compounds or precipitates.

In so treating liquids or waters for the removal of calcium, magnesium and other compounds above referred to, the reagent used is preferably added in excess of that quantity which is sufficient to react with all the compounds to be removed; and where the reagent used is calcium or other hydroxid or hydrate, it also is preferably added in excess of the quantity necessary to react with all the soluble compounds to be removed and to the extent that after such reaction with the compounds in solution the liquid will contain free hydrate or free alkali, for the presence of such alkali assists and speeds the sedimentation, precipitation or flocculation.

Where the liquid treated is sewage, the raw sewage, without addition of any reagent thereto, may be electrolyzed in the chamber 3 or may contain during electrical treatment any suitable reagent, and then, in either case, and preferably immediately after such electrical treatment, calcium or other hydroxid may be introduced with the resultant reactions above referred to, the precipitates resulting from magnesium, calcium or other soluble salts in the sewage being then rapidly sedimentized or carried down by any flocculating material formed either during the electrical treatment or immediately thereafter by the reaction of reagents.

By preference calcium or other hydroxid is introduced into the sewage immediately after the electrical treatment, and is introduced in such quantity as to be in excess of that necessary to react with the substances in solution in the sewage, or with carbonic acid, such excess causing the liquid to contain free alkali, which speeds and hastens sedimentation.

And this introduction of excess of calcium or other hydroxid is of advantage after treatment of the sewage by electric current in the presence of electrodes, particularly positive electrodes, of carbon, certain oxids, alloys, which are not readily attackable, or iron or steel electrodes which have become partially passive or which have coöperated in production of ferric oxid which yields oxygen acting as a germicide; or of copper, which also produces germicidal effects, or of any other suitable metal. Such calcium hydroxid or other reagent added to the sewage after the electrical treatment reacts with carbon dioxid gas or carbonic acid present in the sewage and with the calcium, magnesium and other soluble salts in the sewage, to produce a precipitate which acts as a coagulating or flocculating medium in assisting precipitation of solids or semi-solids in suspension in the sewage.

And when the calcium hydroxid or other suitable alkali is added in excess, as described, it operates, under the stimulation produced by the electric current, to produce immediate coagulation, with resultant very rapid sedimentation. And due to the excess of calcium or other hydroxid used the free alkali in the liquid aids in the precipitation of finely divided suspended matter, and has the further advantage of insuring that free carbonic acid or carbon dioxid is absent from the sewage effluent, and insures that any further formation of carbon dioxid or carbonic acid is prevented, with the result that the growth of certain bacteria is inhibited or prevented. The presence of the free alkali in the liquid effluent insures its combination with carbon dioxid or carbonic acid from the atmosphere when exposed in tanks or contained in water or liquid into which the effluent is discharged. Furthermore, the presence of free alkali in the effluent causes a decrease in the number of bacteria.

When so treating liquid with reagents to produce insoluble salts from the calcium, magnesium and other soluble salts I may use attackable electrodes of iron, steel, copper or other suitable metal, producing from the same in the presence of free alkali in the liquid or water, an hydroxid of the metal of the electrode when the current density is made sufficiently great. This causes coagulation and hastens precipitation of the insoluble precipitate produced by these reagents, owing to the flocculent coagulating properties of such hydroxid. This permits rapid sedimentation, or immediate filtration, in far shorter time than by the ordinary non-electrical method with like reagents.

By my process chemical and physical reaction are stimulated because of the more complete ionization of the salt content of the liquid or water, which increased activity or stimulation persists for some time after the current has ceased to pass through it.

The oxidation of organic or other matter, and the softening of the liquid or water by changing the calcium, magnesium and other salts into insoluble salts may be accomplished simultaneously. Thus, calcium hydroxid may be used both for the oxidation process and for the softening process dependent upon the character of hardness to be removed. But where calcium hydroxid is used for example, for the oxidation process and soda ash or sodium carbonate is used for the softening process, these reagents should be introduced into the liquid or water at different points, for otherwise they would react upon each other to produce insoluble calcium carbonate, which would be precipitated.

It will be understood that any sediment, precipitate, or collected suspended matter will be kept in agitation by the paddles and will be carried by the flow of the liquid out of chamber 3 to tank 5 where it may settle or be filtered out of the liquid.

This application is in part a continuation of my application Serial Number 837,887, May 11, 1914, which is in turn in part a continuation of my application Serial Number 749,764, February 21, 1913, which latter has matured into Patent No. 1,099,654, July 9, 1914.

What I claim is:

1. The method of removing from liquid or water soluble incrustating salts, which consists in introducing soluble hydroxid, and passing electric current therethrough, whereby the hydroxid reacts with said salts to produce insoluble material.

2. The method of treating liquid or water containing in solution material causing temporary hardness, which consists in introducing into the liquid or water a soluble hydroxid, adapted to react with said material to produce insoluble material, and passing electric current therethrough.

3. The method of treating liquid or water containing in solution material causing temporary hardness, which consists in passing electric current therethrough, and thereafter introducing a soluble hydroxid.

4. The method of treating liquid or water containing in solution material causing temporary hardness, which consists in passing electric current therethrough, and thereafter introducing a soluble hydroxid in quantity in excess of that necessary to react with said material in solution in said liquid or water whereby the effluent contains free alkali.

5. The method of treating liquid or water containing in solution therein material causing permanent hardness, which consists in introducing a soluble carbonate, and passing electric current therethrough.

6. The method of treating liquid or water containing in solution therein material causing permanent hardness, which consists in adding thereto soluble carbonate in excess to the quantity necessary for reacting with said material in said liquid or water, and passing electric current therethrough.

7. The method of treating liquid or water containing in solution therein material causing permanent hardness, which consists in passing electric current therethrough, and thereafter adding a soluble carbonate.

8. The method of treating liquid or water containing in solution therein material causing permanent hardness, which consists in passing electric current therethrough, and introducing a soluble carbonate in excess of the quantity necessary to react with said material in said liquid or water.

9. The method of treating liquid or water having in solution therein material causing hardness, which consists in passing electric current therethrough, and thereafter introducing a material reacting with said first named material to produce a precipitate.

10. The method of treating liquid or water having in solution therein material causing hardness, which consists in passing electric current therethrough, and thereafter introducing a material reacting with said first named material to produce a precipitate and in quantity sufficient to leave an excess of said second named material.

11. The method of treating liquid or water containing material in solution therein causing temporary and permanent hardness, which consists in introducing into said liquid or water separately from each other materials reacting with the materials producing temporary and permanent hardness, and passing electric current therethrough.

12. The method of treating liquid or water containing materials causing temporary and permanent hardness, which consists in passing electric current therethrough, and thereafter introducing into the liquid or water separately from each other materials reacting with said materials producing temporary and permanent hardness.

13. The method of treating liquid or water containing material in solution therein causing temporary and permanent hardness, which consists in introducing into said liquid or water separately from each other a soluble hydroxid and a soluble carbonate, and passing electric current therethrough.

14. The method of treating liquid or water containing materials causing temporary and permanent hardness, which consists in passing an electric current therethrough, and thereafter introducing therein separate from each other a soluble hydroxid and a soluble carbonate.

15. The method of treating liquid or water containing materials causing temporary and permanent hardness, which consists in passing an electric current therethrough, and thereafter introducing therein separate from each other a soluble hydroxid and a soluble carbonate, said soluble carbonate being added in quantity sufficient to insure alkalinity.

16. The method of treating liquid or water containing materials causing temporary and permanent hardness, which consists in passing an electric current therethrough, and thereafter introducing therein separate from each other a soluble hydroxid and a soluble carbonate, said soluble carbonate being added in quantity sufficient to insure alkalinity, either or both of said reagents being added in quantity sufficient to leave the liquid alkaline.

17. The method of treating liquid or water containing materials causing temporary and permanent hardness, which consists in passing an electric current therethrough, and thereafter introducing therein separate from each other calcium hydroxid and sodium carbonate, said carbonate being added in quantity sufficient to insure alkalinity, either or both of said reagents being added in quantity sufficient to leave the liquid alkaline.

18. The method of treating sewage or liquid containing suspended matter or bacteria or both, which consists in electrolyzing the same, and thereafter introducing thereinto an hydroxid reacting with contents of the sewage or liquid to form coagulating material which assists in sedimentation of the suspended matter.

19. The method of treating sewage or liquid containing suspended matter or bacteria or both, which consists in electrolyzing the same, and thereafter introducing thereinto an hydroxid in quantity sufficient to insure free alkali in the liquid or sewage after reaction with the contents thereof.

20. The method of treating sewage or liquid containing suspended matter or bacteria or both, which consists in electrolyzing the same, and thereafter introducing thereinto lime in quantity sufficient to insure free alkali in the liquid or sewage after reaction with the contents thereof.

21. The method of treating sewage or liquid containing suspended matter or bacteria or both, which consists in electrolyzing the same in the presence of a positive electrode of metal yielding under the influence of the electric current an hydroxid of said metal, and thereafter introducing into the sewage or liquid an hydroxid in quantity sufficient to insure free alkali in the sewage or liquid after reaction with the contents thereof.

22. The method of treating sewage or liquid containing suspended matter or bacteria or both, which consists in electrolyzing the same in the presence of a carbon or normally unattackable positive electrode, and thereafter introducing thereinto an hydroxid in quantity sufficient to insure free alkali in the liquid or sewage after reaction with the contents thereof.

23. The process of treating liquid containing soluble incrustating salt, which consists in passing an electric current therethrough, and thereafter adding thereto a re-agent producing with said salt an insoluble salt.

24. The process of treating liquid containing soluble incrustating salt, which consists in passing current therethrough in the presence of a positive electrode of metal to form hydroxid of the metal, and thereafter adding thereto a reagent forming with said soluble salt an insoluble salt.

25. The process of treating liquid containing soluble incrustating salt, which consists in passing current therethrough in the presence of a positive electrode of iron to form iron hydroxid, and thereafter adding thereto a re-agent forming with said soluble salt an insoluble salt.

26. The process of treating liquid having colloidal content, which consists in passing electric current therethrough, and thereafter adding thereto a soluble salt adapted to react with soluble content of said liquid, whereby a coagulant for said colloidal content is formed.

27. The process of treating liquid having colloidal and other insoluble content, which consists in passing electric current therethrough, and thereafter adding thereto an excess of reagent for said other content.

28. The process of treating liquid containing soluble incrustating salt and colloidal matter, which consists in passing electric current therethrough, and thereafter adding thereto an excess of reagent producing with said soluble salt an insoluble salt and coagulant.

29. The process of treating liquid having colloidal content, which consists in passing electric current therethrough in the presence of a positive electrode of metal, and thereafter adding thereto a reagent adapted to react with soluble content of the liquid, whereby coagulant for said colloidal content is formed.

30. The process of treating liquid having colloidal content, which consists in passing electric current therethrough in the presence of a positive electrode of iron, and thereafter adding thereto a reagent, whereby a coagulant for said colloidal content is formed.

31. The process of treating a liquid containing soluble incrustating salt, which consists in passing a current through a part of said mass to render the same persistingly ionized, and thereafter adding thereto a reagent producing with said salt an insoluble salt and re-mixing the said liquids.

32. The process of treating a mass of liquid containing soluble incrustating salt, which consists in passing current through a smaller mass of liquid, thereafter adding to said smaller mass of liquid an excess of reagent producing with said salt an insoluble salt, and mixing said smaller mass of treated liquid with a mass of untreated liquid.

33. The process of treating a liquid containing soluble incrustating salt, which consists in adding thereto an hydroxid acting on said salt to produce an insoluble salt, and passing electric current therethrough, such hydroxid being added in quantity sufficient to cause the liquid to contain free alkali after electrical treatment.

34. The process of treating liquid containing soluble incrustating salt, which consists in adding thereto material rendering the same alkaline and adapted to react with said soluble salt to produce an insoluble salt, said material being added in excess of the amount necessary to react with all of said soluble salt, and passing an electric current through the alkaline liquid.

35. The process of treating liquid having colloidal and other content, which consists in adding thereto an excess of reagent for said other content, and passing electric current therethrough.

36. The process of treating liquid containing soluble incrustating salt and colloidal matter, which consists in adding thereto an excess of reagent producing with said soluble salt an insoluble salt, and passing an electric current therethrough, whereby the incrustating salt is converted and precipitated with the colloidal matter.

37. The process of treating liquid having colloidal content, which consists in adding thereto material rendering the same alkaline, and passing electric current through the alkaline liquid.

38. The process of treating liquid containing oxidizable material and dissolved incrustating salt, which consists in adding thereto material forming with the incrustating salt an insoluble salt and which renders the liquid alkaline, and passing electric current therethrough, whereby production of said insoluble salt is hastened and oxygen produced for oxidizing said oxidizable material.

39. The method of treating liquid containing incrustating salt in solution, which consists in adding thereto a material forming with said incrustating salt an insoluble salt, and passing electric current through the liquid, said material being of such nature and added in such quantity as to render the liquid alkaline.

40. The method of treating liquid containing incrustating salt in solution, which consists in adding thereto a material forming with said incrustating salt an insoluble salt, and passing electric current through the liquid, said material being of such nature and added in such quantity as to render the liquid alkaline after electrical treatment.

41. The method of treating liquid having colloidal matter therein, which consists in adding to the liquid material rendering the same alkaline, and passing electric current therethrough, said material being added in such quantity as to render the liquid alkaline.

42. The method of treating liquid having colloidal matter therein, which consists in adding to the liquid material rendering the same alkaline, and passing electric current therethrough, said material being added in such quantity as to render the liquid alkaline after electrical treatment.

43. The process of treating liquid containing soluble incrustating salt, which consists in passing an electric current therethrough, and thereafter adding thereto a reagent producing with said salt an insoluble salt, said reagent being added in quantity sufficient to cause said liquid to be alkaline after reaction with said soluble incrustating salt.

In testimony whereof I have hereunto affixed my signature this 5" day of August, 1915.

CLARENCE P. LANDRETH.

---

Corrections in Letters Patent No. 1,222,637.

It is hereby certified that in Letters Patent No. 1,222,637, granted April 17, 1917, upon the application of Clarence P. Landreth, of Philadelphia, Pennsylvania, for an improvement in "Electrochemical Treatment of Liquids," errors appear in the printed specification requiring correction as follows: Page 2, line 114, for the word "ars" read *are;* page 6, line 28, claim 27, for the word "insoluble" read *soluble;* and that the said Letters Patent should be read with these corrections therein that the same may conform to the record of the case in the Patent Office.

Signed and sealed this 1st day of May, A. D., 1917.

[SEAL.]

R. F. WHITEHEAD,
*Acting Commissioner of Patents.*

Cl. 204—25.